United States Patent [19]
Van De Polder et al.

[11] Patent Number: 4,730,209
[45] Date of Patent: Mar. 8, 1988

[54] CIRCUIT FOR CONVERTING A COLOUR TELEVISION TIME DIVISION MULTIPLEX SIGNAL INTO SIMULTANEOUS SIGNALS

[75] Inventors: Leendert J. Van De Polder; Leonard J. M. Esser, both of Eindhoven, Netherlands

[73] Assignee: U.S. Philips Corporation, New York, N.Y.

[21] Appl. No.: 833,632

[22] Filed: Feb. 27, 1986

[30] Foreign Application Priority Data

Mar. 19, 1985 [NL] Netherlands ................. 8500787

[51] Int. Cl.$^4$ ............................................ H04N 11/12
[52] U.S. Cl. ...................................... 358/11; 358/31; 358/12; 358/15
[58] Field of Search ................. 358/11, 12, 13, 14, 358/15, 16, 31

[56] References Cited

U.S. PATENT DOCUMENTS 4,353,093 10/1982 Durbin .................................. 358/31
4,454,534 6/1984 Lüder .................................. 358/31

Primary Examiner—Michael A. Masinick
Attorney, Agent, or Firm—Thomas A. Briody; William J. Streeter; Gregory P. Gadson

[57] ABSTRACT

A color television Y/U/V luminance-chrominance multiplex signal with signals which may or may not be compressed in time comprises for a television line the associated luminance information Y and half the chrominance information U or V. As a result the circuit should supply the chrominance information directly (U, V) and repeatedly (U', V') during a subsequent television line. To avoid the use of an accurate, expensive delay device having a line period delay, the circuit includes an input shift register (A) of the series-in, parallel-out type, which is coupled through an on-off switch circuit (B1, B2) to parallel inputs of two shift registers (C1, C2) of the parallel-in, series-out type. During a line blanking period (THB) writing is effected from the input shift register in the output shift registers and during two subsequent line scan periods (THS1, THS2) reading is effected consecutively therefrom. Reading may be effected in opposite phase if a repetition is to be effected after exactly one line period.

10 Claims, 5 Drawing Figures

CIRCUIT FOR CONVERTING A COLOUR TELEVISION TIME DIVISION MULTIPLEX SIGNAL INTO SIMULTANEOUS SIGNALS

BACKGROUND OF THE INVENTION

The invention relates to a color television receiver having a converter circuit for converting a time division multiplex television signal into simultaneous signals, said time division multiplex signal having an interrupted sequence of a first information component relating to luminance information occurring in first periods, the first information components being separated by a further sequence of a second and a third information component relating to chrominance information occurring in second and third periods, respectively, said simultaneous signals corresponding to the first, second and third information components and repeated third and second information components, respectively, said second and third information components, either repeated or not, being expanded in time so that they occur in the simultaneous signals during the same first period or a fourth period, respectively, as the first information components when said periods correspond to television line scan periods, the converter circuit including signal sampling, expansion and repetition circuit disposed between a circuit input and a circuit output for the second and third information components relating to chrominance information, said circuits being formed with shift registers having different write and read rates under the control of clock pulses of different clock pulse frequencies. The invention also relates to an integrated circuit suitable therefor.

A color television receiver of this kind can be used with, for example, a color television system as described in a public report "Experimental and Development Report 118/82" by the English "Independent Broadcasting Authority" (I.B.A.) entitled "MAC: A Television System for High-Quality Satellite Broadcasting". The report gives several variants for a so-called MAC (Multiplexed Analog Component) picture coding. As is apparent from a survey table on page 9 of the report, it holds for all variants that the luminance and chrominance information each undergo a time compression, with the compression for the chrominance information being twice that of the luminance information. The chrominance information comprising two components per line period and alternately one of the two occurs compressed in time in the time division multplex coded signal. The luminance information associated with each line period is present in a time-compressed state in this signal. For the time compression associated with the luminance information the report gives the factors ⅔ and ¾, leading to time compression factors of ⅓ and ⅜ for the chrominance information. The picture information per line period in the time division multiplex coded signal is sequentially composed of the time-compressed luminance information and one of the two associated time-compressed chrominance information components.

In the receiver the time division multiplex coded signal is derived from the signal received through the transmission channel, i.e. the satellite connection, which signal is applied to the circuit described which supplies a time expansion for the luminance and chrominance information with the aid of synchronizing and identification information and which repeatedly supplies the expanded chrominance information over the subsequent line period.

For the variants described a system may be considered in which the luminance information is not compressed or is hardly compressed so that only the chrominance information components require signal expansion.

Repetition of the chrominance information may be realized in the receiver in known manner by using a delay device having a delay time of one line period. This delay device succeeds the expansion circuit which supplies the chrominance information directly during one line period and through the delay device during the subsequent line period. In this case the requirements apply that the delay device delays the signal only over exactly one line period and does not exert any further influence on amplitudes, frequencies and phases. Compliance with these requirements leads to the use of an expensive, accurate delay device in which ageing phenomena should not exert any influence.

SUMMARY OF THE INVENTION

It is an object of the invention to realize a color television receiver having a circuit of the type described in which an expensive delay device is not required for the chrominance information repetition in the simultaneous signals. To this end a color television receiver according to the invention is characterized in that for the signal sampling, expansion and repetition circuit (or means) the said input of the converter circuit is coupled to a signal input of at least one input shift register of the series-in, parallel-out type and that the said circuit output of the converter circuit with the expanded second and third information components relating to chrominance, repeated or not, is coupled to respective signal outputs of first and second output shift registers of the parallel-in, series-out type, parallel outputs of the input shift register being coupled through an on-off switch circuit to respective parallel inputs of the first and second output shift registers, said switch circuit being periodically conducting prior to the occurrence of the first or fourth periods during television line blanking periods and being non conducting during the first and fourth television line scan periods, the first and second output shift registers alternately applying per respective line scan period the second and third information components, and the repeated second and third information components, respectively to the respective circuit output.

Apart from the favorable fact that a delay circuit need not be applied for obtaining chrominance signal repetition, the uniform signal handling for the direct and the repeated chrominance signal provides an optimum uniformity of the two sequential output signals.

A simple embodiment of a color television receiver according to the invention is characterized in that the signal sampling, expansion and repetition circuit includes a single input shift register having a number of register stages corresponding to substantially twice the number of register stages of one of the output shift registers, the parallel outputs of the input shift register being consecutively and alternately coupled to the parallel inputs of the first and second output shift registers, respectively.

It follows from this choice of an input shift register having twice the number of register stages that the clock pulse freuency must be twice that upon writing in the input shift register than in the known case of a single in/output shift register of the series-in, series-out type which is operative as a signal expansion circuit.

An embodiment which does not require a writing clock pulse frequency which is twice as large is characterized in that the signal sampling, expansion and repetition circuits include first and second input shift registers each having a number of register stages which is substantially equal to the number of register stages of one of the output shift registers, the parallel outputs of the first and second input shift registers being coupled to the parallel inputs of the first and second output shift registers, respectively.

A further simple embodiment may be characterized in that the clock pulse frequency for the sampling circuit whose output is coupled via a switching circuit to the respective signal inputs of the first and second input shift registers is twice the clock pulse frequency for these input shift registers and the switching circuit.

In order to achieve, if desired, that the repeated output signal occurs eactly one line period later than the directly preceding output signal, an embodiment is characterized in that reading in the first register is effected in opposite phase to reading in the second output shift register. In fact when writing in one input shift register or in the two input shift registers, the information in corresponding register stages is shifted over one writing clock pulse period.

In order that both chrominance information components can be processed with the aid of the single shift register or the two input shift registers, an embodiment is characterized in that the signal sampling, expansion and repetition circuits have four output shift registers which, as pairs of first and second output shift registers, are coupled to first and second outputs, respectively, of the converter circuit, switching arrangement associated with one pair of first and second output shift registers and the other pair of first and second output shift registers, respectively, being alternately operative during first and second line blanking periods.

An integrated circuit according to the invention, suitable for use in a color television receiver, is characterized in that a circuit substrate of a first semi-conductor type has at least three parallel channels of a different semiconductor type, an inner channel being separated from a juxtaposed outer channel by interrupted regions of the first semiconductor type, separate electrode systems insulated from the substrate being provided above the channels associated with the input and output shift registers, an electrode strip being provided above the said regions in the substrate and insulated therefrom, said strip and regions being associated with the switch-on/off circuit.

A further embodiment having a single input shift register is characterized in that the circuit substrate of the first semiconductor type has three parallel channels of the different semiconductor type the inner channel being separated from the two outer channels by interrupted regions of the first semi-conductor type, which interruptions to the one and the other outer channel are shifted over half the length of a region, the outer channels meeting at a closed end of the inner channel in the substrate; three separate electrode system insulated from the substrate being provided above the inner channel and the two outer channels associated with the input shift register and the two output shift registers, respectively, two electrode strips being provided on either side of the inner channel above the said regions in the substrate and insulated therefrom, said strips combined with the regions being associated with the switch-on/off circuit.

Yet another embodiment which can supply both chrominance information components directly and repeatedly is characterized in that the circuit substrate of the first semiconductor type has five parallel channels of the different semiconductor type, the inner channel being separated from the two juxtaposed channels by interrupted regions of the first semiconductor type, said interruptions facing each other, a juxtaposed channel being separated from an outer channel by interrupted regions of the first semiconductor type, said interruptions between the outer and juxtaposed channels being provided over half the number of interruptions between the inner channel and the juxtaposed channel, an outer channel and the juxtaposed channel meeting at one end, five separate electrode systems insulated from the substrate being provided above the inner channel and the two juxtaposed channels and two outer channels associated with the input shift register and the four output shift registers, respectively, two electrode strips being provided on either side of the juxtaposed channels above the said regions in the substrate and insulated therefrom, said strips combined with the regions being associated with one of the switch-on/off circuits.

An embodiment of an integrated circuit whose structure gives rise to reading in the first and second output shift registers in opposite phase is characterized in that a final output shift register stage is disposed in the region where the channels meet, the number of electrodes of one final stage being half that of the other final stage.

BRIEF DESCRIPTION OF THE DRAWINGS

The invention will be described by way of example with reference to the drawing, in which.

DETAILED DESCRIPTION OF THE INVENTION

Figure 1:
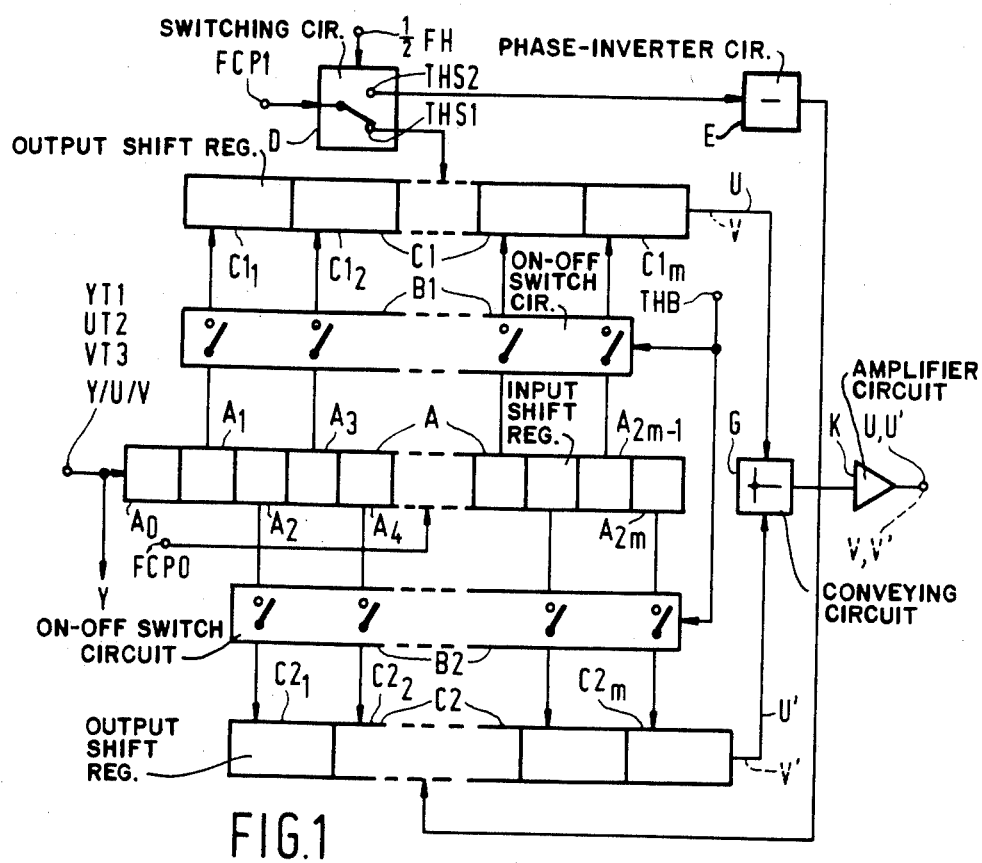
FIG. 1 is a block-schematic diagram of a circuit forming part of a color television receiver according to the invention.

In FIG. 1 the reference A denotes an input shift register of the series-in, parallel-out type. The signal input of shift register A is coupled to a circuit input to which a time division multiplex signal Y/U/V denoted at this input is applied. The input with the signal Y/U/V occurs in a color television receiver which is suitable for use in a color television system operating with a transmission or storage of the time division multiplex signal Y/U/V. The reference Y represents the information component relating to luminance and the references U and V represent two information components relating to chrominance. It is assumed that the luminance information component Y occurs as first information in an interrupted sequence in first periods T1 as is denoted by YT1 in FIG. 1. The first information components Y are separated by a further sequence of a second (U) and a third information component (V) relating to chrominance occurring in second (T2) and third (T3) periods, respectively, which is denoted by UT2 and VT3 in FIG. 1. The sequence in the time division multiplex signal Y/U/V may be arbitrary. A cycle U, Y, V, Y over two line periods is mentioned as an example. Associated therewith are the luminance information components Y for two sequential television lines. Both chrominance information components U and V are associated as color difference signals with one of these two television lines, or one component is associated with the other line. Independent thereof it is necessary in the receiver to repeat the chrominance information components U and V once. The chrominance information components U and V occur compressed in time in the time division multiplex signal Y/U/V. The luminance information Y may occur in a compressed or non-compressed state. The said article describes television systems in which the luminance information Y always occurs compressed in time in the time division multiplex signal Y/U/V. U.S. Pat. No. 4,633,295 describes a television system in which the luminance information Y does not (substantially) occur compressed in time in the time division multiplex signal Y/U/V which comprises the compressed chrominance information components U and V where U, V, Y is mentioned as a cycle. Here an information repetition is also required for the chrominance information components U and V. Independent of the specific embodiment of the color television receiver there is always the necessity of chrominance information repetition. The color television receiver may be formed either as a receiver-display device having a display screen, or as a receiver-transmitter. The receiver-transmitter may form part as a transducing device of, for example, a central aerial system.

FIG. 1 shows at the circuit input with the signal Y/U/V that the luminance information Y is processed elsewhere in the color television receiver. The manner of processing is not described because it is irrelevant to the invention. It is important that ultimately three simultaneous signals are formed which correspond to the first information components relating to luminance and the second and third information components relating to chrominance and the repeated third and second information components relating to chrominance, respectively. In this case the repeated or non-repeated second and third information components relating to chrominance are to be expanded in such a manner that they occur in (the first or fourth) periods in which also the first information components relating to luminance occur, that is, in the same television line scan periods. In the case of the first or fourth periods the luminance information Y occurs in a non-compressed or a compressed state, respectively, in the time division multiplex signal Y/U/V. In FIG. 1 the references U, U' at a circuit output denote the simultaneously made second, direct and repeated chrominance information components. A further possibility, shown in broken lines, is the supply of the simultaneously made third, direct and repeated chrominance information components V, V'. The supply of U, U' or V, V' is dependent on the period T2 or T3 in which information is written in the input shift register A. In FIG. 1 writing is effected under the control of clock pulses having a frequency FCP0 as is shown at a clock pulse input of register A. The clock pulses of the clock pulse frequency FCP0 originate from a clock pulse source (not shown) which can supply further clock pulses at different frequencies. The occurrence of the clock pulses at the frequency FCP0 during the period T2 or T3 determines whether ultimately the information U, U' or V, V' occurs at the circuit output.

To explain the operation of the circuit according to FIG. 1 which, between the input with the time division multiplex signal Y/U/V and the output with the signals U, U' or V, V' includes a signal sampling, expansion and repetition circuit, the following applies. The input shift register A is shown with a plurality of (2m+1) register stages $A_0, A_1, A_2, A_3, A_4, \ldots A_{2m-1}, A_{2m}$. The first stage $A_0$ coupled to the input with the signal Y/U/V is operative as a sampling circuit with the clockpulses of the frequency FCP0 being active as sampling clock pulses. The subsequent register stages are provided with parallel outputs which are consecutively and alternately coupled ($A_1, A_3, \ldots A_{2m-1}$; $A_2, A_4, \ldots A_{2m}$) via first and second on-off switch circuits B1 and B2, respectively, to parallel inputs of first and second output shift registers C1 and C2, respectively. The registers C1 and C2 are shown with registers stages $C1_1, C1_2, \ldots C1_m$ and $C2_1, C2_2 \ldots C2_m$, respectively. It is apparent that the number of (2m+1) register stages of the input shift register A is equal to substantially twice the number of m register stages of the output shift registers C1 and C2. The output shift registers C1 and C2 are of the parallel-in, series-out type. In the registers C1 and C2 writing is effected from the register A via the respective switch circuits B1 and B2, namely during a television line blanking period THB succeeding the second and third period UT2 or VT3, respectively, during which information has been written in the register A. In FIG. 1 the period THB is shown at a switching input for the common switch circuit (B1, B2). After the period THB the circuit (B1, B2) is non-conducting and the output shift registers C1 and C2 can be alternately controlled during television line scan periods THS for reading. FIG. 1 shows that clock pulse inputs of the registers C1 and C2 are coupled to a respective output of a switching circuit denoted by D. The switching circuit D has a switching output at which a first line scan period is denoted by THS 1. At a further switching output the reference THS2 denotes a second, subsequent line scan period, which output is coupled via a phase inverter circuit (−) denoted by E to the clock pulse input of the register C2. The switching circuit D has a control switching input which receives a switching signal denoted at this input at half the line frequency ($\frac{1}{2}$ FH) from a source not shown, so that alternately the outputs are connected to a signal input during periods THS1 and THS2 denoted at these outputs. Clock pulses having a clock pulse frequency FCP1 denoted at the input are applied to this signal input of the switching circuit D. Under the control of the clock pulses of the frequency FCP1 the output shift register C1 supplies the expanded chrominance information U (or V) during the first line scan periods THS1 to an input of a conveying circuit denoted by G. During the second, subsequent line scan periods THS2 the output register C2 supplies the expanded chrominance information U' (or V') to a further input of the circuit G. The contents of the chrominance information U' (or V') are equal to those of the chrominance information U (or V), except for a shift over one register stage of the input shift register A. The circuit G alternately conveys the information components U and U' (or V and V') to an input of an amplifier circuit K an output of which is connected to the circuit output at which the expanded information U, U' (or V, V') occurs. The extent of the expansion is equal to half the ratio between the clock pulse frequency FCP0 and FCP1. This half factor emanates from the signal distribution over the two output shift registers C1 and C2.

When writing in and reading from the shift registers A, C1 and C2, charge packets corresponding to the chrominance information are shifted on. During the line blanking period THB subsequent to the period UT2 or VT3 the registers C1 and C2 are considered to have the same position without a mutual stage shift. Subsequently the charge packets are alternately shifted on to the conveying circuit G.

FIG. 1 shows that a signal sampling, expansion and repetition circuit (A, B, C, D, E, G, K) supplies the information components U, U' or V, V' without a separate delay device being required for the repetition (U' or V'). The substantially identical structure of two units (A, B1, C1) and (A, B2, C2) provides the same signal processing for the chrominance information, so that an optimum uniformity of the two consecutive output signals can be obtained.

FIG. 1 shows that the contents of the output shift registers C1 and C2 have a shift of one register stage from the input shift register A. In order to achieve, if desired, that the (repeated) output signal originating from register C2 occurs exactly one line period later than the signal from the register C1, the clock pulses at the registers C1 and C2 should occur in opposite phases. In FIG. 1 this has been achieved by using the phase-inverter circuit E. An alternative solution is the use of a signal delay device having a time delay which is equal to half a clock pulse period ($\frac{1}{2}$ FCP1).

Figure 2:
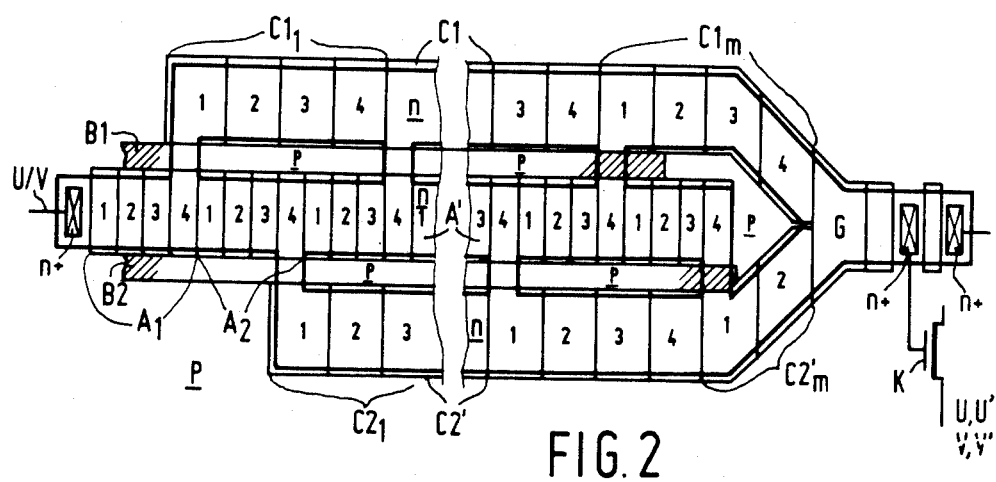
FIG. 2 shows a possible embodiment of an integrated circuit having some components shown in FIG. 1.

FIG. 2 shows an embodiment of an integrated circuit including some of the components shown in FIG. 1. Components shown in FIG. 1 have the same or adapted reference numerals in FIG. 2. The integrated circuit of FIG. 2 is formed by way of example as a charge-coupled device. Three parallel channels of the semiconductor n type are formed in a substrate of the semiconductor p type. FIG. 2 shows an inner channel and two outer channels associated with respective registers A', C1 and C2'. The first and second register stages $A_1$ and $A_2$ are denoted at the register A'. The first and last stages $C1_1$ and $C1_m$ are denoted at the register C1. The first and last stages $C2_1$ and $C2'_m$ are denoted at the register C2'. Between the three channels there are p-type regions separated from each other. The inner channel is separated from the two outer channels by the interrupted p-type regions, the interruptions to one and the other outer channel being shifted over half the length of a region. The outer channels meet (at G) at the closed end of the inner channel in the substrate. Electrode systems electrically insulated from the substrate are provided on this substrate with the n-type channels and the p-type regions. Each register A', C1 and C2' is formed with a four-phase electrode system denoted by 1, 2, 3 and 4. The electrode systems may be provided in a single or multilayer structure on and in the insulating layer. For the sake of simplicity the electrodes are shown in a contiguous position, but they are insulated from each other, with four comb-shaped electrodes being present per system. The references B1 and B2 denote two conducting strips which are partly shaded in FIG. 2. The strips B1 and B2 extend over the p-type regions and the interruptions therebetween. Under the control of voltages applied to the strips B1 and B2 these interruptions will be active as the switches shown in FIG. 1 of the switch circuit (B1,B2). The two electrode strips B1 and B2 and the interrupted p-type regions jointly constitute the respective switch circuits (B1,B2). A region of the n+ type is shown for an input contact at the circuit input with the signal U/V. On the opposite side of the integrated circuit a first n+ region is shown for connection to a supply voltage. Furthermore, a second n+ region separated through an electrode of a reset gate is shown, which has a connection to a transistor operating with an insulating gate electrode and forming part of the amplifier circuit K. The drain electrode of the transistor (K) leads to the output at which the signal U, U' or V, V' occurs.

The simplicity of the embodiment of the integrated circuit shown in FIG. 2, substantially with the registers A', C1, C2', the switch-on/off circuit (B1, B2) and the conveying circuit G leads to a signal processing which is as uniform as possible for the two chrominance information components U and U' and V and V', respectively, which is favorable.

It is to be noted that the electrode associated with the circuit G has its own voltage supply so that the charge packets are passed on only from the registers C1 and C2' during the line scan periods THS1 and THS2, respectively. Furthermore FIG. 2 shows that the last stage $C2'_m$ of the register C2' is different from the last stage $C1_m$ of the register C1. By providing the stage $C2'_m$ in the manner shown with only half the number of electrodes, a shift in opposite phase to the conveying circuit G is automatically achieved so that the circuit E formed as a phase-inverter circuit or a delay device with the time delay of half a clock pulse period can be omitted. Reading at the output shift registers C1 and C2' is already effected in opposite phase on account of the circuit structure.

For an embodiment which is more detailed than that shown in FIG. 2 reference is made to U.S. Pat. Nos. 3,965,481 and 4,207,477.

Figure 3:
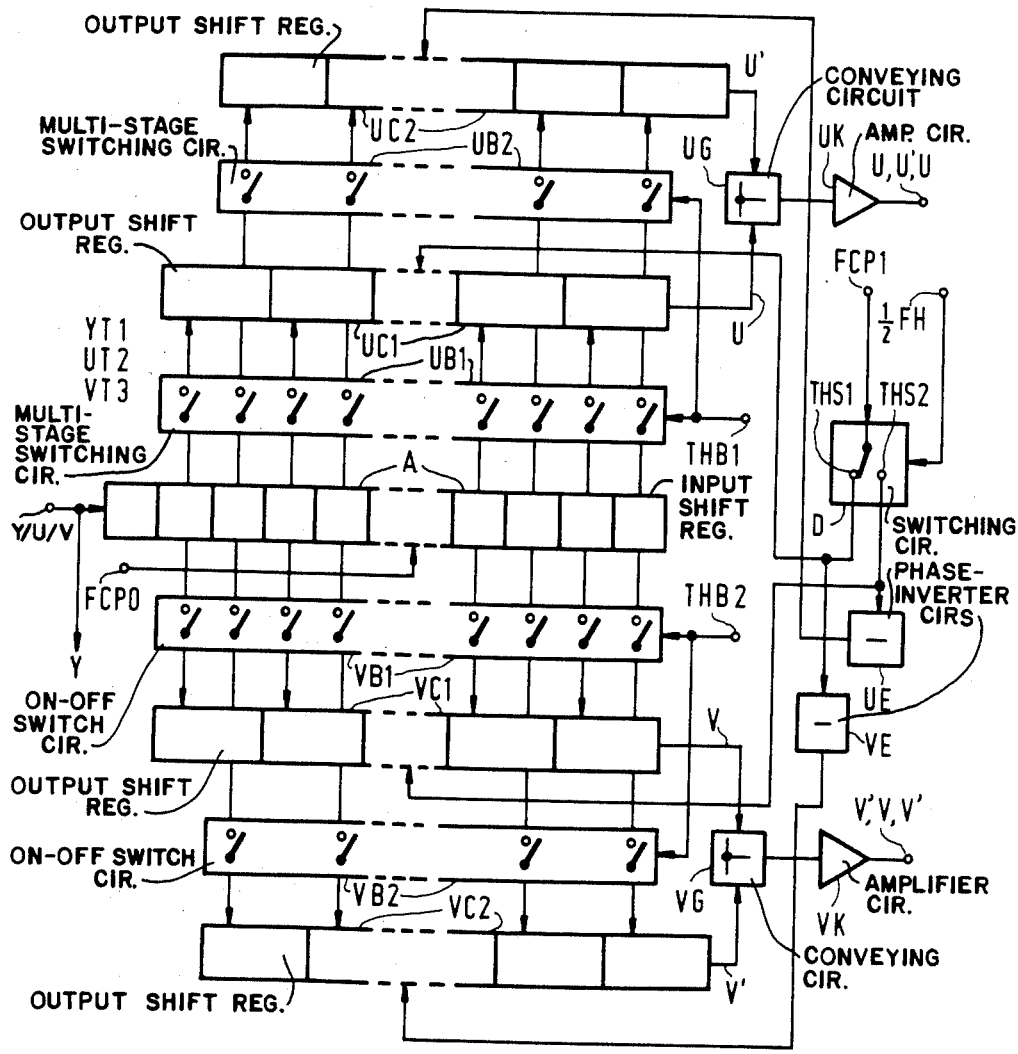
FIG. 3 is a block-schematic diagram of an embodiment different from that shown in FIG. 1.

FIG. 3 is a block diagram of an embodiment different from the one shown in FIG. 1. Components denoted in FIG. 1 have the same or adapted references. The input shift register A is present in an unmodified form, whereas there are four output shift registers UC1, UC2, VC1 and VC2. The four output shift registers are coupled, as compared with the said first (C1) and second (C2) output shift registers, to first and second outputs, providing respectively, signals U, U', U and V', V, V'. One coupling comprises the conveying circuit UG and the amplifier circuit UK and the other comprises the conveying circuit VG and the amplifier circuit VK, respectively. The references UB1 and UB2 denote multi-stage switching circuits which are conducting during line blanking periods THB1. The references VB1 and VB2 denoted on-off switch circuits which are conducting during line blanking periods THB2. The output with the associated period THS1 of the switching circuit D is coupled directly to the register UC1, but via a phase-inverter circuit VE to the register VC2. The output with the associated period THS2 is directly coupled to the register VC1 and via a phase-inverter circuit UE to the register UC2. Here the circuits UE and VE may also be replaced by delay devices having a delay of half a clock pulse period.

To explain the operation of the circuit according to FIG. 3 the following applies, starting from the supply of a time division multiplex signal Y/U/V with the cycle U, Y, V, Y over two line periods having periods UT2, YT1, VT3, YT1. During the period UT2 the U chrominance information is written in the form of charge packets in the input shift register A under the control of clock pulses of the frequency FCPO. During the first subsequent line blanking period THB1 this information is transferred through the circuit (UB1, UB2) to the output shift registers UC1 and UC2. In accordance with the embodiment shown in FIG. 3 the information intended for register UC2 may be passed on via the register UC1 or by bypassing it. During the first subsequent line scan period THS1 the register UC1 with the information U is read out to the circuit output (U, U', U) and during the second subsequent line scan period THS2 the register UC2 with the information U' is read out. The same information processing occurs shifted over one line period at the output shift registers VC1 (information V, period THS2) and VC2 (information V', period THS1) after these are filled from the register A during the line blanking period THB2 subsequent to the information period VT3. FIG. 3 shows that with a signal sequence U, U', U at one circuit output the other circuit output conveys the signal sequence V', V, V'.

Figure 4:
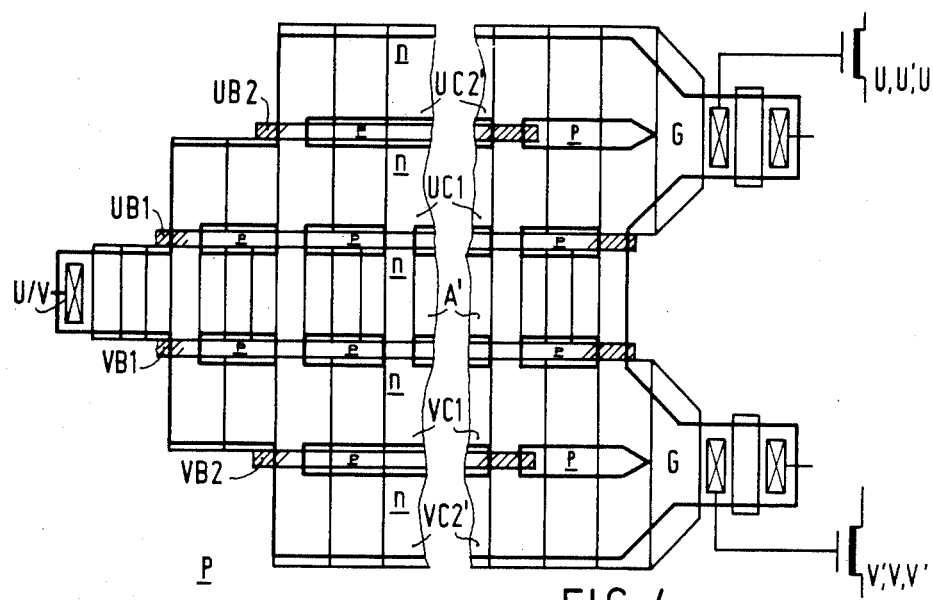
FIG. 4 shows a possible embodiment of an integrated circuit for FIG. 3

FIG. 4 shows an embodiment of an integrated circuit which can operate likewise as the circuit of FIG. 3. Reference is made to the description of FIG. 2 for the descriptions of the structure of the regions of the circuit according to FIG. 4. FIG. 4 shows five parallel channels of the semiconductor n-type. The inner channel (A') is separated from the two juxtaposed channels (UC1, VC1) by the interrupted p-type regions. The interruptions face each other in this case. The said juxtaposed channel (UC1, VC1) is separated from an outer channel (UC2' and VC2', respectively) by further interrupted p-type regions, while the number of further interruptions is half that of the number on the other side. The outer channel (UC2' or VC2') and the juxtaposed channel (UC1 or VC1) meet each other at one end (G). FIG. 4 shows five separated, substrate-insulated electrode systems above the respective channels. On either side of the juxtaposed channels (UO1 and VC1) electrode strips UB1 and UB2 and VB1 and VB2, respectively, are present above the p-type regions, which strips together with the p-type regions are associated with one of the switching circuits (UB1, UB2) and (VB1, VB2). The registers UC1 plus UC2' and VC1 plus VC2' are alternately filled with information from the register A'. In accordance with FIG. 4 the information intended for the registers UC2' and VC2' is passed through the registers UC1 and VC1, respectively, with the aid of the switch circuits (UB1, UB2) and (VB1, VB2), respectively. For a more detailed embodiment reference is made to U.S. Pat. No. 4,131,950.

Figure 5:
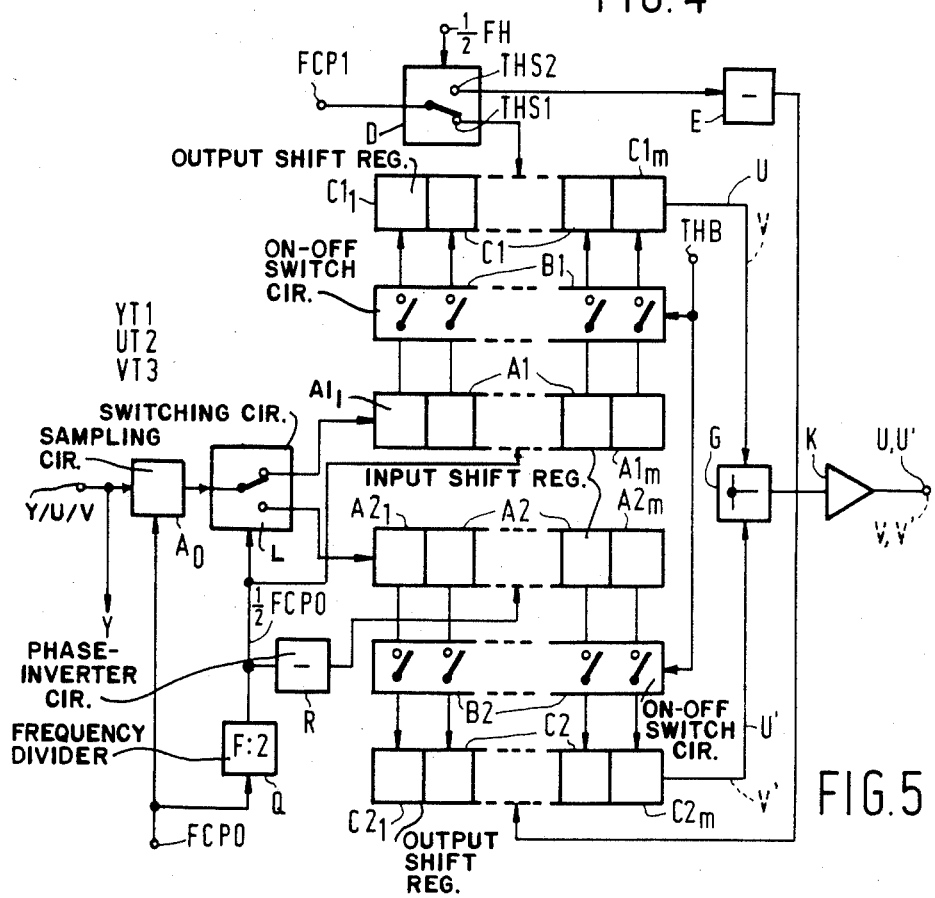
FIG. 5 is a block-schematic diagram of yet another embodiment different from that of FIG. 1.

FIG. 5 shows a further embodiment which is different from that in FIG. 1. Components shown in FIG. 1 have been given the same or adapted references. Instead of the single input shift register A of FIG. 1 there are provided first and second input shift registers A1 and A2, respectively, as is shown in FIG. 5. All input and output shift registers A1, A2 and C1, C2 are provided with a number of m register stages. In the manner described in FIG. 1 for the units (A, B1, C1) and (A, B2, C2) the unit (A1, B1, C1) supplies the information U (or V) and the unit (A2, B2, C2) supplies the information U' (or V').

The relevant chrominance information components are supplied to the registers A1 and A2 through a separate sampling circuit A0 and a switching circuit L. Sampling clock pulses of the clock pulse frequency FCPO are applied to the circuit A0. The clock pulses of the frequency FCPO are applied through a frequency divider Q having a dividing factor of two (F:2) to a switching input of the switching circuit L. The clock pulses of the frequency ½ FCPO are further directly applied to a clock pulse input of the input shift register A1 and are applied through a phase-inverter circuit R to a clock pulse input of the input shift register A2. Instead of the phase-inverter circuit R a delay device having a delay which is equal to a clock pulse period 1/FCPO may be used.

The supply of chrominance information during the period UT2 or VT3 is distributed over the two input shift registers A1 and A2 and written in the form of charge packets. The registers A1 and A2 which are then active in opposite phase are driven by the clock pulses of the frequency ½ FCPO, which may be advantageous relative to the double clock pulse frequency FCPO for the single input shift register A of FIG. 1. The extent of signal expansion is also equal to a factor of ½ FCPO divided by FCP1. Likewise as the circuit according to FIG. 3 shows a possible extension of the circuit according to FIG. 1, the same extension may be effected for the circuit according to FIG. 5.

Instead of using the switching circuit L for the distribution of information, a common input stage for the registers A1 and A2 may be considered in which the chrominance information present as a charge packet is divided into two equal charge packets which are then synchronously passed on by the registers A1 and A2.

An integrated circuit suitable for use with the circuit according to FIG. 5 may be realized in a simple manner by dividing the input shift register A' in the embodiment of FIG. 2 into two input shift registers which are separated from each other. A contiguous p-type region in the center in the longitudinal direction of the inner n-type channel may be considered. The same modification may be used for the integrated circuit shown in FIG. 4 so that the extension shown in FIG. 3 may likewise be effected in the circuit shown in FIG. 5. For all embodiments of the integrated circuit at least three parallel channels of the n-type are present in the circuit substrate of the p-type, an inner channel being separated from a juxtaposed outer channel by interrupted p-type regions. Separate electrode systems which are insulated from the substrate are present above the channels associated with the input shift registers A', A1 and A2, respectively, or the output shift registers C1 and C2, UC1 and UC2' and VC1 and VC2', respectively. The electrode strip is present above the said regions in the substrate and insulated from this substrate, which strip and regions are associated with the switch circuit (B1, B2), (UB1, UB2) and (VB1, VB2), respectively.

We claim:

1. A color television receiver having a converter circuit for converting a time division multiplex television signal into simultaneous signals, said time division multiplex signal having an interrupted sequence of a first information component relating to luminance information occurring in first periods, the first information components being separated by a further sequence of a second and a third information component relating to chrominance information occurring in second and third periods, respectively, said simultaneous signals corresponding to the first, second and third information components and repeated third and second information components, respectively, said second and third information components, either repeated or not, being expanded in time so that they occur in the simultaneous signals during the same first period or a fourth period, respectively, as the first information components when said first or fourth periods correspond to television line scan periods, the converter circuit including signal sampling, expansion and repetition means disposed between a circuit input and a circuit output for the second and third information components relating to chrominance information, said means being formed with shift registers having different write and read rates under the control of clock pulses of different clock pulse frequencies, characterized in that for the signal sampling, expansion and repetition means the said circuit input of the converter circuit is coupled to a signal input of at least one input shift register of the series-in, parallel-out type and that the said circuit output of the converter circuit with the expanded second and third information components relating to chrominance, repeated or not, is coupled to respective signal outputs of first and second output shift registers of the parallel-in, series-out type, parallel outputs of the input shift register being coupled through an on-off switch circuit to respective parallel inputs of the first and second output shift registers, said switch circuit being periodically conducting prior to the occurrence of the first and fourth periods during television line blanking periods and being non-conducting during the first or fourth television line scan periods, corresponding to the first and second output shift registers alternately applying per respective line scan period the second and third information components, and the repeated second and third information components, respectively, to the respective circuit output.

2. A color television receiver as claimed in claim 1, wherein the signal sampling, expansion and repetition means include a single input shift register having a number of register stages corresponding to substantially twice the number of register stages of one of the output shift registers, the parallel outputs of the input shift register being consecutively and alternately coupled to the parallel inputs of the first and second output shift registers, respectively.

3. A color television receiver as claimed in claim 1, wherein the signal sampling, expansion and repetition means include first and second input shift registers each having a number of register stages which is substantially equal to the number of register stages of one of the output shift registers, the parallel outputs of the first and second input shift registers being coupled to the parallel inputs of the first and second output shift registers, respectively.

4. A color television receiver as claimed in claim 3, wherein the clock pulse frequency for the sampling means whose output is coupled via a switching circuit to the respective signal inputs of the first and second input shift registers is twice the clock pulse frequency for said input shift registers and the switching circuit.

5. A color television receiver as claimed in any one of the preceding claims, wherein reading in the first register is effected in opposite phase to the reading in the second output shift register.

6. A color television receiver as claimed in any one of the claims 1-4, wherein the signal sampling, expansion and repetition means have four output shift registers which, as pairs of first and second output shift registers, are coupled to first and second outputs, respectively, of the converter circuit, the switch circuits associated with one pair of first and second output shift registers and the other pair of first and second output shift registers, respectively, being alternately operative during first and second line blanking periods.

7. An integrated circuit suitable for use in a color television receiver having a converter circuit for converting a time division multiplex television signal into simultaneous signals, said time division multiplex signal having an interrupted sequence of a first information component relating to luminance information occurring in first periods, the first information components being separated by a further sequence of a second and a third information component relating to chrominance information occurring in second and third periods, respectively, said simultaneous signals corresponding to the first, second and third information components and repeated third and second information components, respectively, said second and third information components, either repeated or not, being expanded in time so that they occur in the simultaneous signals during the same first period or a fourth period, respectively, as the first information components when said first or fourth periods correspond to television line scan periods, the converter circuit including signal sampling, expansion and repetition means disposed between a circuit input and a circuit output for the second and third information components relating to chrominance information, said means being formed with shift registers having different write and read rates under the control of clock pulses of different clock pulse frequencies, wherein for the signal sampling, expansion and repetition means the said circuit input of the converter circuit is coupled to a signal input of at least one input shift register of the series-in, parallel-out type and that the said circuit output of the converter circuit with the expanded second and third information components relating to chrominance, repeated or not, is coupled to respective signal outputs of first and second output shift registers of the parallel-in, series-out type, parallel outputs of the input shift register being coupled through an on-off switch circuit to respective parallel inputs of the first and second output shift registers, said switch circuit being periodically conducting prior to the occurrence of the first and fourth periods during television line blanking periods and being non-conducting during the first or fourth television line sca periods, corresponding to the first and second output shift registers alternately applying per respective line scan period the second and third information components, and the repeated second and third information components, respectively, to the respective circuit output, said integral circuit comprising: a circuit substrate of a first semiconductor type having at least three parallel channels of a different semiconductor type an inner channel being separated from a juxtaposed outer channel by interrupted regions of the first semiconductor type; separate electrode systems insulated from the substrate above the channels associated with the input and output shift registers; and an electrode strip above the said regions in the substrate and insulated from the substrate, said strip regions being associated with the switch-on/off circuit.

8. An integrated circuit as claimed in claim 7, wherein the circuit substrate of the first semiconductor type has three parallel channels of the different semiconductor type, the inner channel being separated from the two outer channels by interrupted regions of the first semiconductor type, which interruptions to the one and the other outer channel are shifted over half the length of a region, the outer channel meeting at a closed end of the inner channel in the substrate, three separate electrode systems insulated from the substrate being provided above the inner channel and the two outer channels associated with the input shift register and the two output shift registers, respectively, two electrode strips being provided on either side of the inner channel above the said regions in the substrate and insulated therefrom, said strips combined with the regions being associated with the switch- on/off circuit.

9. An integrated circuit as claimed in claim 7, wherein the signal sampling, expansion and repetition means have four output shift registers which, as pairs of first and second output shift registers, are coupled to first and second outputs, respectively, of the converter circuit, the switch circuits associated with one pair of first and second output shift registers and the other pair of first and second output shift registers, respectively, being alternately operative during first and second line blanking periods, and wherein the circuit substrate of the first semiconductor type has five parallel channels of the different semiconductor type, the inner channel being separated from the two juxtaposed channels by interrupted regions of the first semiconductor type, said interruptions facing each other, a juxtaposed channel being separated from an outer channel by interrupted regions of the first semiconductor type, said interruptions between the outer and juxtaposed channels being provided over half the number of interruptions between the inner channel and the juxtaposed channel, an outer channel and the juxtaposed channel meeting at one end, five separate electrode systems insulated from the substrate being provided above the inner channel and the two juxtaposed channels and the outer channels associated with the input shift register and the four output shift registers, respectively, two electrode strips being provided on either side of the juxtaposed channels above the said regions in the substrate and insulated therefrom, said strips combined with the regions being associated with one of the switch-on/off circuits.

10. An integrated circuit as claimed in claim 8 wherein reading in the first register is effected in opposite phase to the reading in the second output shift register, and a final output shift register stage is disposed in the region where the channels meet, the number of electrodes of one final stage being half that of the other final stage.

* * * * *